A. I. HARDIN.
MACHINE FOR CLEANING COTTON SEED.
No. 30,573. Patented Nov. 6, 1860
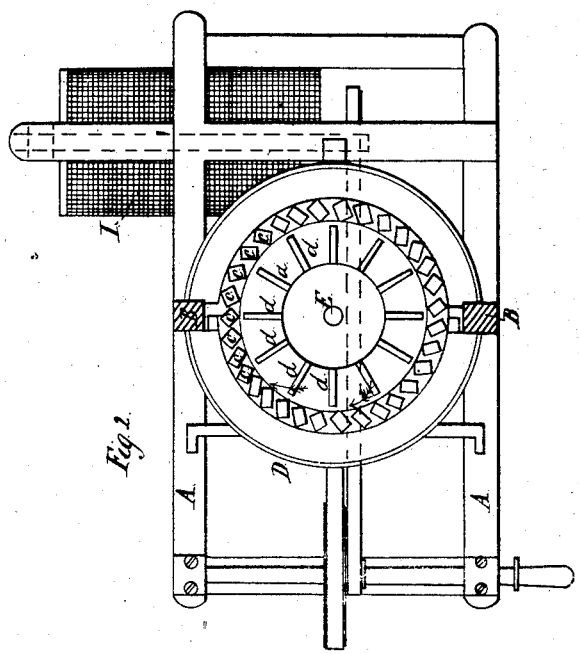
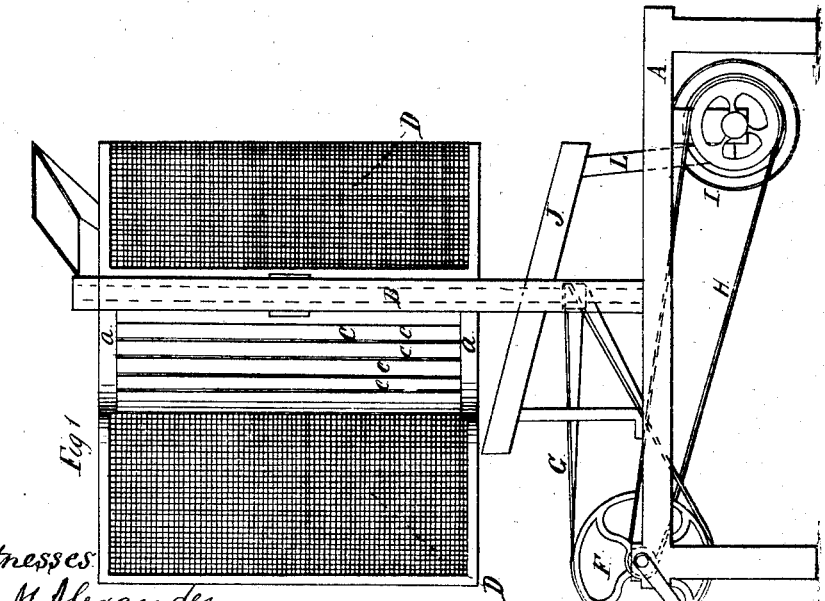

UNITED STATES PATENT OFFICE.

A. I. HARDIN, OF SHELBY, NORTH CAROLINA.

IMPROVEMENT IN MACHINES FOR CLEANING COTTON-SEED.

Specification forming part of Letters Patent No. 30,573, dated November 6, 1860.

*To all whom it may concern:*

Be it known that I, A. I. HARDIN, of Shelby, in the county of Cleveland and State of North Carolina, have invented certain new and useful Improvements in Machines for Hulling and Cleaning Cotton-Seed; and I do hereby declare that the following is full, clear, and exact description of the same, reference being had to the accompanying drawings, and to the letters of reference marked thereon.

The nature of my invention consists in constructing and arranging the several parts of this machine in the particular manner hereinafter described.

On the annexed drawings, making a part of this specification, A represents a frame, upon which are erected two supports or standards, B B. Between the supports, and at a suitable distance apart, are placed and secured two disks, $a\ a$. These disks are connected together by means of a series of square bars, $c\ c\ c$, as shown in the figures, the bars being secured to the disks near their peripheries, so as to form a cylinder, which is shown and marked C, Figure 1. The position of the bars and the appearance they present is seen in Fig. 2.

E represents a cylinder within the cylinder C', which is provided upon its periphery with a series of spikes or teeth, $d\ d\ d$. These pins extend out from the cylinder E, so as almost to touch the external cylinder.

D represents an external casing, which is made of gauze-wire, and which surrounds the cylinder C. Upon the frame A, and under the cylinder C, is situated an annular inclined plane, J, upon which the seed, &c., fall after descending from the cylinder above.

G represents a belt, which connects the shaft of the cylinder E with a driving-wheel, F. A band, H, from the shaft of the driving-wheel connects with a pulley upon the shaft of a revolving screen, I, as shown in Fig. 1.

L represents a spout, which conveys the seed, &c., from the inclined plane J to the revolving screen I.

In the operation of this machine the cotton-seed are placed in a hopper upon top of the cylinder C, so that they will be fed into said cylinder after the machine has been set in motion. The cylinder E has a rapid motion communicated to it through the band and driving-wheel, and when the seed fall into the cylinder C, between its arms $d\ d$ on cylinder E, they are struck by these arms or teeth and thrown off at a tangent against the bars $c\ c\ c$; but as these bars present a flat surface to the seed as they fly off in their tangential line it will be seen that they (the seed) rebound and are again struck by the teeth or arms, which drive them against the bars again. The seed being thus driven backward and forward, and being violently struck by the arms or teeth as they revolve, they are broken, and the hull and lint pass away from the kernel. The air passes into the cylinder C between its bars $c\ c$, and a portion of the lint passes out from the cylinder through the same channels. The lint which thus passes out is caught and retained by the external gauze-wire screen or covering, D. The hull and lint and kernels which pass down the cylinder C and fall upon the inclined plane J are carried down through the spout L and into the screen I, and as said screen revolves the kernels fall through its meshes, and the hull and lint pass out at the end of the screen.

Having thus fully described my invention, what I claim as new, and desire to secure by Letters Patent, is—

1. The arrangement of the cylinder E, provided with arms or pins $d\ d$, with the cylinder C, composed of a series of square bars, $c\ c\ c$, placed in the position represented, and with the external gauze casing, D, the same being used and operating in the manner and for the purpose herein specified.

2. In combination with the subject of the first claim, the inclined plane J, spout L, and revolving screen I, when used as and for the purpose specified.

A. I. HARDIN.

Witnesses:
C. M. ALEXANDER,
JOHN J. WATSON.